(12) United States Patent
Goss

(10) Patent No.: US 6,687,241 B1
(45) Date of Patent: Feb. 3, 2004

(54) ENTERPRISE CONTACT SERVER WITH ENHANCED ROUTING FEATURES

(75) Inventor: Raymond G. Goss, Austin, TX (US)

(73) Assignee: WorldCom, Inc., Clinton, MS (US)

(*) Notice: Subject to any disclaimer, the term of this patent is extended or adjusted under 35 U.S.C. 154(b) by 0 days.

(21) Appl. No.: 09/317,561

(22) Filed: May 24, 1999

Related U.S. Application Data

(63) Continuation-in-part of application No. 08/976,162, filed on Nov. 21, 1997, now Pat. No. 6,493,447.

(51) Int. Cl.⁷ .............................................. H04L 12/64
(52) U.S. Cl. ........................................ 370/352; 379/265
(58) Field of Search ................................ 370/352–356; 379/309, 93.12, 265, 266; 709/203, 219, 248

(56) References Cited

U.S. PATENT DOCUMENTS

| | | | |
|---|---|---|---|
| 5,155,761 A | | 10/1992 | Hammond |
| 5,185,782 A | * | 2/1993 | Srinivasan ................... 379/67 |
| 5,206,903 A | * | 4/1993 | Kohlev et al. .............. 379/309 |
| 5,268,957 A | | 12/1993 | Albrecht |
| 5,311,574 A | | 5/1994 | Livanos |
| 5,384,841 A | | 1/1995 | Adams et al. |
| 5,533,100 A | | 7/1996 | Bass et al. |
| 5,535,256 A | | 7/1996 | Maloney et al. |
| 5,590,188 A | * | 12/1996 | Crockett ..................... 379/225 |
| 5,602,846 A | * | 2/1997 | Holmquist et al. ......... 370/384 |
| 5,625,682 A | | 4/1997 | Gray et al. |
| 5,692,033 A | | 11/1997 | Farris |

(List continued on next page.)

FOREIGN PATENT DOCUMENTS

| | | |
|---|---|---|
| EP | 0 856 980 | 8/1998 |
| WO | 98/54877 | 12/1998 |

OTHER PUBLICATIONS

Webline Communications Corporation Press Release, Sep. 1997 pp. 1–3.*

Harry Newton, Newton's Telecom Dictionary, Copyright, 1994, Flatiron Publishing Inc., 7ᵗʰ Ed., pp. 106, 297, 298 and 920 IBSN 0–936648–60–0.

Gawrys et al., "ISDN: Integrated Network/Premises Solutions", Integrating the World Through Communications, Toronto, Canada, Jun. 22–25, 1986, International Conference on Communications, New York, IEEE, US, vol. 1, Jun. 22, 1986, pp. 1–5.

*Primary Examiner*—Kenneth Vanderpuye

(57) ABSTRACT

The present invention is an Enterprise Contact Server that enables customers to submit call-back requests to agents located at any one of a plurality of call centers via the Internet, or virtually any other communications technology available. A call-back to the customer can be placed via any communications technology available. In its preferred embodiment, the Enterprise Contact Server first selects from skill level tables and agent status tables a qualified agent to whom a call-back request can be routed. The Enterprise Contact Server then enables the call-back request to be submitted by a customer directly from an HTML page on a Web site, and have that same HTML page be presented to the selected qualified agent located at one of the plurality of call-back contact centers. The agent can then place a telephone call to the number provided by the customer who submitted the call-back request, and at the same time, establish a TCP/IP communications session with the customer. This TCP/IP session can proceed between the agent's Web browser and the customer's Web browser, and the visible actions performed by the agent are transferred to the customer and displayed on the customer's browser. The TCP/IP session proceeds simultaneous with the telephone call between the agent and the customer.

30 Claims, 10 Drawing Sheets

U.S. PATENT DOCUMENTS

| | | | |
|---|---|---|---|
| 5,742,674 A | | 4/1998 | Jain et al. |
| 5,754,830 A | | 5/1998 | Butts et al. |
| 5,761,289 A | | 6/1998 | Keshav |
| 5,761,507 A | | 6/1998 | Govett |
| 5,778,060 A | | 7/1998 | Otto |
| 5,793,861 A | | 8/1998 | Haigh |
| 5,825,869 A | * | 10/1998 | Brooks et al. ............... 379/265 |
| 5,826,014 A | * | 10/1998 | Coley et al. ........... 395/187.01 |
| 5,838,682 A | * | 11/1998 | Dekelbaum et al. ........ 370/401 |
| 5,871,909 A | | 2/1999 | .ANG.strom et al. |
| 5,884,032 A | * | 3/1999 | Bateman ................ 395/200.74 |
| 5,907,547 A | * | 5/1999 | Foladare et al. ............ 370/352 |
| 5,926,538 A | * | 7/1999 | Deryugin et al. ........... 379/265 |
| 5,933,492 A | * | 8/1999 | Turovski .................... 379/285 |
| 5,954,798 A | | 9/1999 | Shelton et al. |
| 5,995,614 A | * | 11/1999 | Miloslovsky ............... 379/265 |
| 6,035,332 A | | 3/2000 | Ingrassia, Jr. et al. |
| 6,049,779 A | * | 4/2000 | Berkson ...................... 705/14 |
| 6,088,441 A | * | 7/2000 | Flockhart et al. ........... 379/265 |
| 6,130,933 A | | 10/2000 | Miloslavsky |
| 6,163,536 A | | 12/2000 | Dunn et al. |
| 6,188,673 B1 | * | 2/2001 | Bauer et al. ................ 370/282 |
| 6,192,050 B1 | | 2/2001 | Stovall |
| 6,421,717 B1 | | 7/2002 | Kloba et al. |
| 6,493,447 B1 | | 12/2002 | Goss et al. |

* cited by examiner

FIG. 7

ENTERPRISE CONTACT SERVER WITH ENHANCED ROUTING FEATURES

CROSS REFERENCE TO RELATED APPLICATION

This patent application is a continuation-in-part patent application of patent application Ser. No. 08/976,162 for CONTACT SERVER FOR CALL CENTER, filed Nov. 21, 1997, now U.S. Pat. No. 6,493,447.

FIELD OF THE INVENTION

The present invention relates to data communications, and more particularly, to an enhanced customer to company call center communications system in the telecommunications industry.

DESCRIPTION OF THE PRIOR ART

In the telecommunications industry, call centers are used to provide customer and operator services for business clients. Traditionally, customers of these business clients place a phone call to a toll-free telephone number to reach a call center customer service agent. They are then served over the phone. Often, because of the limited number of agents at a call center and the large number of calls, a customer's call is placed in a queue until an agent becomes available.

Many customers in the telecommunications industry interact with the Internet and World Wide Web, and use the Web for a variety of business services. This presents a business opportunity to interact with customers who are familiar with browsing the Web, by presenting to the customer a Web site and an opportunity to interact with the telecommunications company. However, the World Wide Web is not an interactive media, and is primarily composed of many static HTML pages at any given Web site.

The customers browsing the Web site may have a need to speak with a customer service agent, either with respect to the Web site and information posted there, or with respect to their transactions with the telecommunications company.

Many companies, including telecommunications companies, maintain call centers to interact with their customers. These call centers may provide order entry clerks for new orders, billing services for resolving problems with invoices, shipments or returns, technical support, and trouble ticketing for customers having a high volume of transactions with the company.

However, given the volume of customer calls, and the company resources available to respond to the calls, most calls to the call center are placed on hold by an automatic call director ("ACD"), and the initial customer interaction is with an interactive voice response unit ("VRU"), which is primarily intended to direct the call to the proper agent, and is not programmed to answer a customer's questions. This frequently leads to aggravated customers who are unable to resolve their concerns in a timely manner.

The only means presently available to contact a company call center agent and not be placed on hold, is to place a telephone call and submit a call-back request via the telephone, or to send an e-mail request to the "web master" of the Web site. Current Web services do not allow call-back requests to be submitted via the Web or other interactive means.

SUMMARY OF THE PRESENT INVENTION

The present invention is directed to a call routing system for a Network/enterprise that enables routing of messages, calls, and data between call centers distributed throughout a Network/enterprise. The call routing system for a Network/enterprise particularly invokes a method of locating and reserving skilled agents in one of a plurality of remote centers before initiating a call transfer or conference. Routing of messages, calls, and data between call centers distributed throughout the Network/enterprise is particularly enabled by implementing routing algorithms based on agent skills, agent availability, workflow states, and load balancing to determine the route path. The call routing system may be readily integrated with existing ACDs, as well as email, Voice/video over IP, the H.323 Gateways/Gatekeepers, URL push services, and other distributed communication systems.

Particularly, the present invention is directed to improvements to the telecommunications call center architecture described in co-pending U.S. patent application Ser. No. 08/976,162 assigned to the assignee of the present invention, and incorporated by reference herein. In the telecommunications call center architecture, an Enterprise Contact Server is provided which enables enterprise-level processing and routing of both contact requests and inbound calls originating from any communications source, e.g., standard PSTN telephony, IP telephony, the Web, and other HTTP means. "Enterprise-level processing and routing" means that agents at any of a plurality of call centers having a Center Contact Server, may receive a contact request from a customer, and fulfill that request by placing a contact to the customer. A single means for placing contact requests, such as a Web page link or a telephone number, can be used to place contact requests that are supported by the plurality of call centers.

Particularly, each Enterprise Contact Server performs the following functions: 1) it communicates with each call center Contact Server; and, 2) it tracks the states and availabilities of resources (e.g., agents) at each of a plurality of call centers. Specifically, each Center Contact Server sends event messages to the Enterprise Contact Server to continuously update the Enterprise Contact Server with current states and availability data. When a contact request is received, the Enterprise Contact Server determines and selects an available qualified agent among the agents at the plurality of call centers, and then sends the contact request to the Center Contact Server that supports the selected agent.

Advantageously, the present invention can also be used to route inbound calls, i.e., those calls made to a call center via the PSTN, the Internet or other IP telephony network, or virtually any communications means, throughout the network, with the same systems architecture as used on processing and routing contact requests. That is, contact requests are treated as inbound calls, and the same systems architecture, including the Enterprise Contact Server and plurality of call center Contact Servers, is used to process and route both.

BRIEF DESCRIPTION OF THE DRAWINGS

FIG. 7 is a representative illustration of a sample HTML web page which enables a call back request.

DETAILED DESCRIPTION OF THE PREFERRED EMBODIMENT

Figure 1:
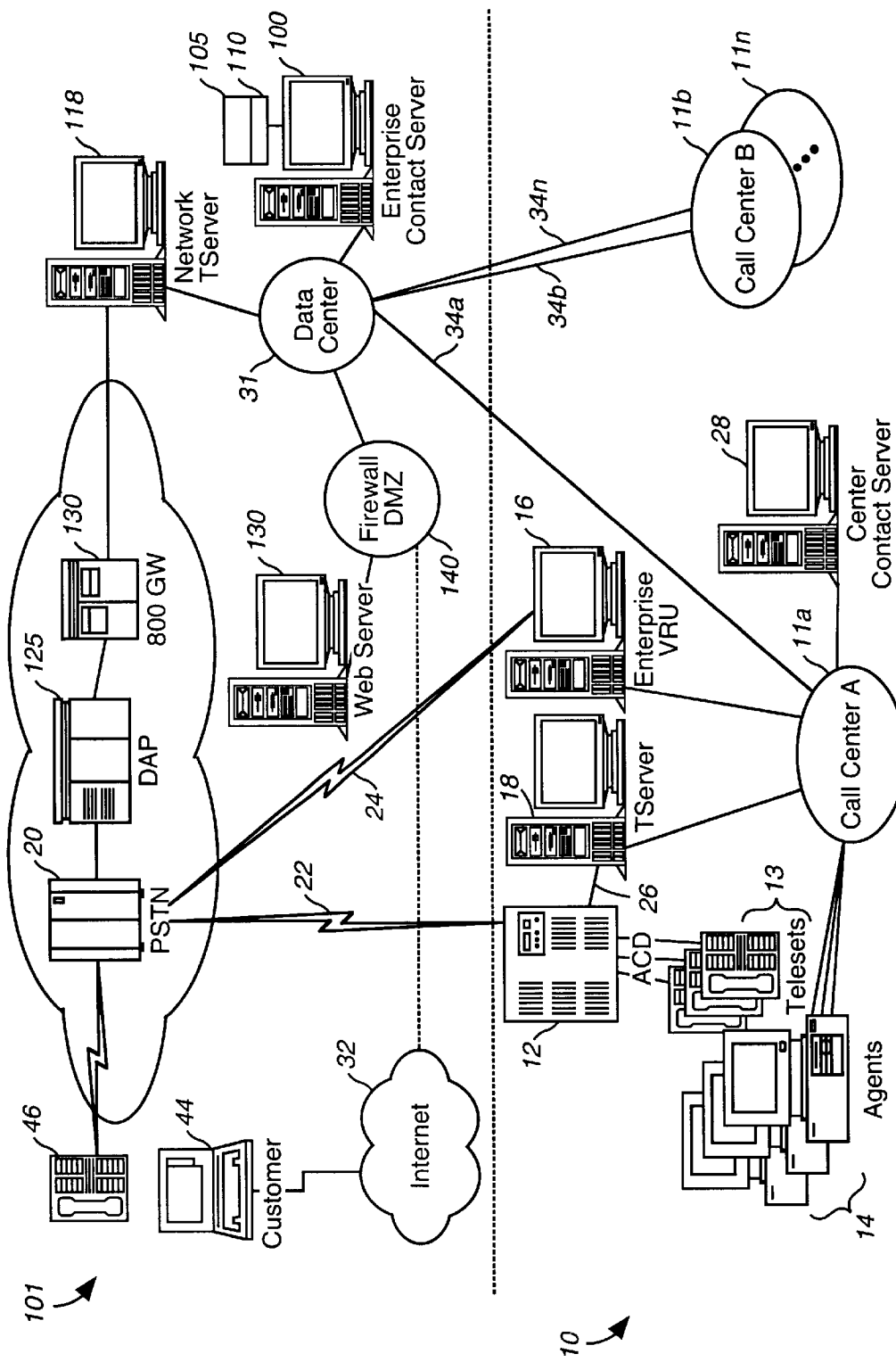
FIG. 1 is a diagrammatic illustration of the logical communications network architecture implementing the enterprise contact server of the present invention.

Commonly owned and co-pending U.S. Pat. No. 08/976,162, describes a computer system called a Contact Server, integrated within a novel telecommunications system architecture, that allows customers to place contact requests to a call center by any available communications means, including the Internet, and to receive contacts from an agent by any available communications means. By the reason that requests can be placed by means other than via a telephone network, these requests are interchangeably referred to herein as "contact requests" or "call-back requests." For instance, the methodology described captures contacts by an agent other than a call, but rather a contact such as an HTTP session, for example. The Contact Server described in U.S. Pat. No. 08/976,162 is used to provide "contact services" for customers separate from, in addition to and in conjunction with any call back services provided by ACD and VRUs. The Contact Server may also receive contact requests directly from customers over an IP network from web server, and distribute requests to qualified agents at agent work stations at the call center. The contact server may also reserve qualified agents for specific types of problems in order to fulfill the call-back request. In the manner described in U.S. Pat. No. 08/976,162, customers submit call-back requests via the Internet, an Intranet or other comparable IP network, and agents may fulfill those requests by placing outbound calls to the customers via the ACD and PSTN. However, the Contact Server is designed to manage call-back services in a manner that is independent of the communications networks used. These call back services may include other methods of receiving and fulfilling call-back requests such as Internet voice telephony, Internet video, chat or e-mail communications.

The call center contact server also facilitates communications with other data sources, such as a data base server, or other data resources, such as a company main frame. These data sources include components such as database servers that store and serve data specific to whatever applications and services are provided by the call center. For example, one implementation of the Contact Server and call-back service is to enhance a service that enables external customers of the company to view any trouble tickets over the Internet or IP network by accessing a trouble ticket database. Alternately, the Contact Server may access a company main frame system which provides problem identification services for customers.

The present invention is directed to communications systems architecture employing an Enterprise Contact Server that enables the routing of messages, calls, and data between and among multiple call centers distributed throughout a network/enterprise. As will be described, the Enterprise Contact Server 100 in conjunction with a communications systems architecture 101 provides contact services to customers over virtually any communications means, e.g., PSTN and the Internet. To place a contact request or an inbound call, a customer may use the standard telephone connected to the PSTN, a PC with an IP telephony application connected to the Internet for placing IP calls, or a PC with a Web Browser for interfacing with the Web. The Internet is another communications means for providing contact requests, and for providing contacts such as described in the patent U.S. Pat. No. 08/976,162. However, the exception is that contact requests that are collected by an Intranet Web Server are sent to the Enterprise Contact Server, rather than a call center contact server.

Figure 2:
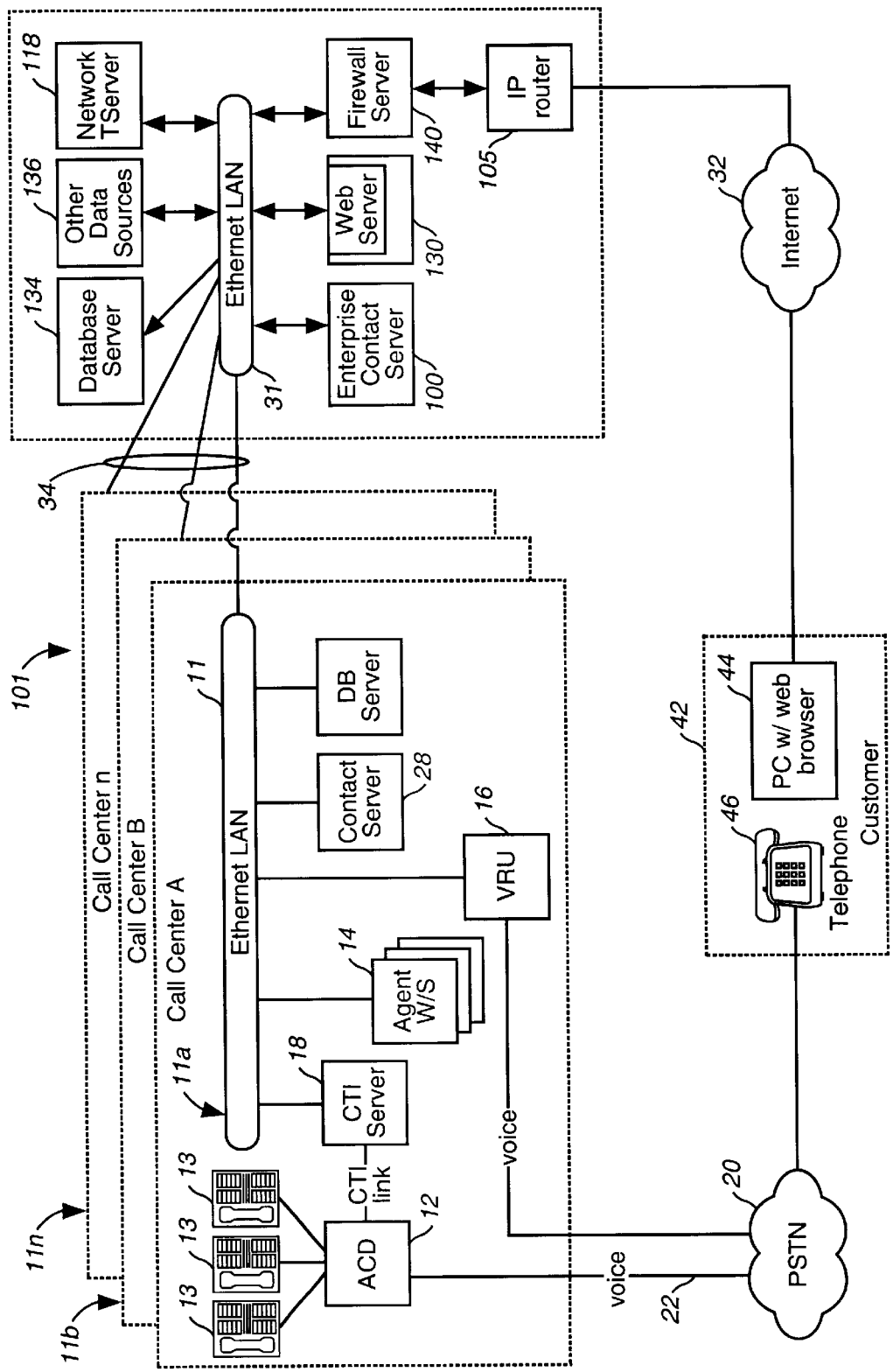
FIG. 2 is a diagrammatic illustration of a physical network architecture, illustrating one possible implementation of the logical architecture of FIG. 1.

The figurative diagram of FIG. 1 and the corresponding preferred physical architecture diagram of FIG. 2 both illustrate the communications system architecture 101 employing the Enterprise Contact server 100 of the invention. Such a communications system architecture 101 and enterprise contact server 100 provides enhanced enterprise-level call routing and contact request service for calls initiated from the public Internet 32 or public switched telephone network 20 to any of a plurality of call centers 11a, 11b, . . . , 11n.

As shown in FIG. 1, there is illustrated a single call center 10 having the following components: 1) an Automatic Call Distributor 12 ("ACD") which provides a telephony switching means that interfaces with a public switched telephone network ("PSTN") 20 via voice trunks 22 for inbound and outbound telephone calls, queues inbound calls, and distributes inbound calls among the plurality of agents; 2) a call center Contact Server 28 that supports resources (e.g., agents) at the call center in the manner such as described in above-mentioned, co-pending U.S. patent application Ser. No. 08/976,162; 3) one or more agent workstations 14 including a Personal Computer (PC) running customized communications and browser software and capable of receiving call data from the Contact Server 28, and interfacing with the Internet for IP telephony sessions and collaborative HTTP sessions over the Web; 4) one or more agent telesets 13 used for telephone calls over the PSTN 20 via the ACD 12; 5) a Computer/Telephony Interface ("CTI") Server 18, such as the "TServer" product offered by Genesys Corporation, that is connected to a CTI port of the ACD 12 via link 26 and which provides event data received at ACD to computers such as the agent workstations, VRUs, and the call center Contact Server 28; and 6) a LAN 11 (corresponding to the labeled "Call Center A") that provides data connectivity among the various components of the call center 10. Data interfaces to the ACD are provided by the CTI server.

Additionally, associated with the call center 10 is an Enterprise Voice Response Unit ("VRU") 16 that runs specialized interactive voice response ("IVR") applications for providing automated customer and operator services for callers. As shown in FIG. 1, the VRU 16 has a separate voice link 24 to the PSTN 20 to enable direct connection to the call center LAN 11a to forward call data to the Center Contact Server 28. In this configuration, any calls received over the PSTN 20 can be routed to any ACD at any call center. Although FIG. 1 depicts a single Enterprise VRU 16 associated with a single call center, it is understood that one Enterprise VRU can be used for the plurality of other call centers. If the architecture is such that an Enterprise VRU is located with each call center, then the Enterprise VRU is directly connected to the call center LAN; otherwise, a WAN can be used. Furthermore, there is provided a database server 34 representing and embodying all databases related to the contact or call-back service at the local call center level including: call-back request database in which call-back requests are stored and queued, agent state tables, and agent skills tables at the call center level.

As shown in FIG. 1, each respective call center LAN 11a, 11b, . . . , 11n is connected by a respective WAN 34a, 34b, . . . , 34n to a centralized Data Center LAN 31 to enable data transactions with the Enterprise Contact Server 100 of the invention. As a consequence, each Enterprise VRU 16 is also connected to the Data Center 31 via the WAN. In the embodiment shown in FIG. 1 in which there is one Enterprise VRU 16 per call center, a call to a particular Enterprise VRU 16 can be routed to any call center to reach an available qualified agent via the data center LAN 31.

Figure 3A:
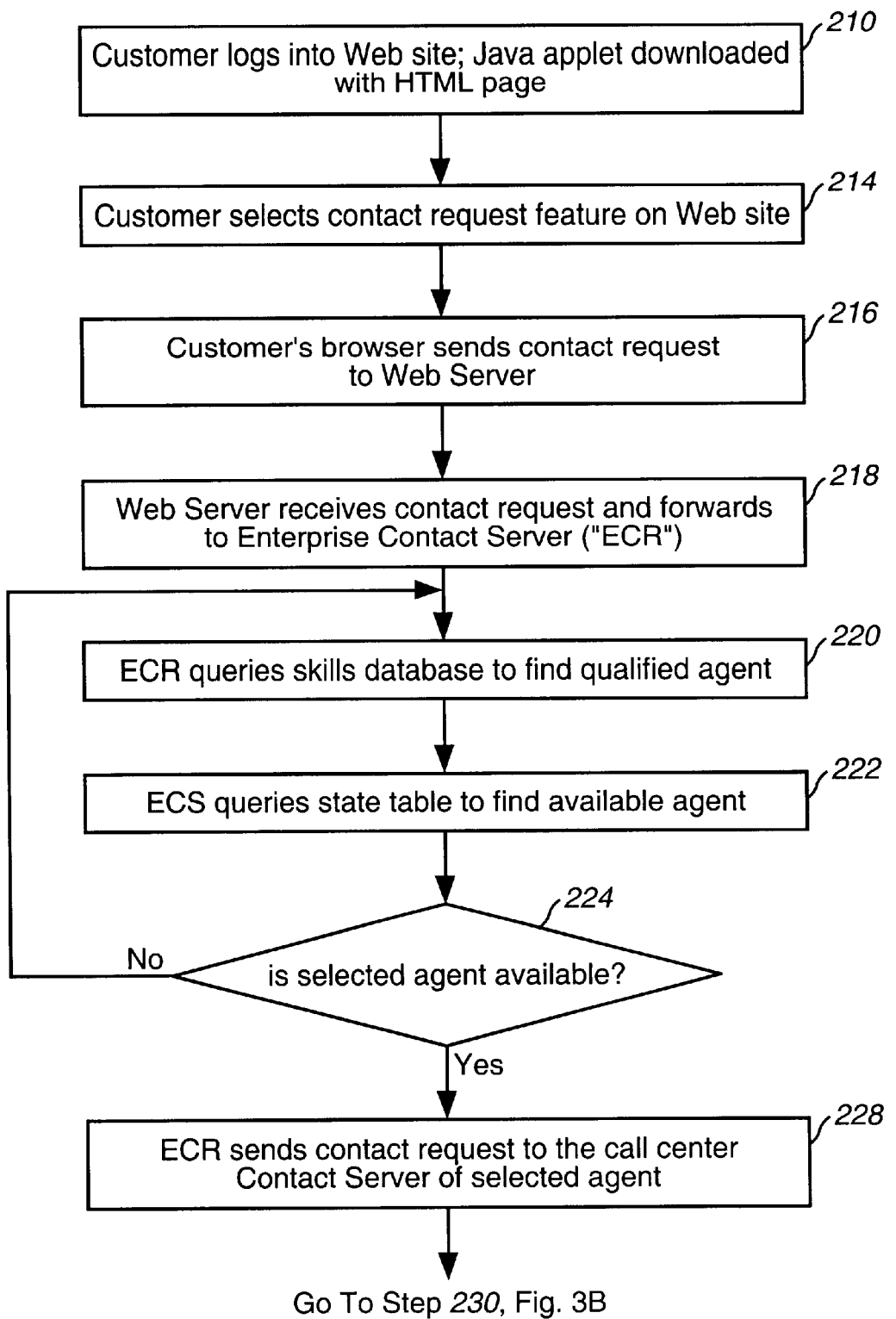
FIGS. 3(a)–3(c) together comprise a flowchart illustrating a process for performing enterprise-level routing of a contact request using the Enterprise Contact Server of the invention.
Figure 3B:
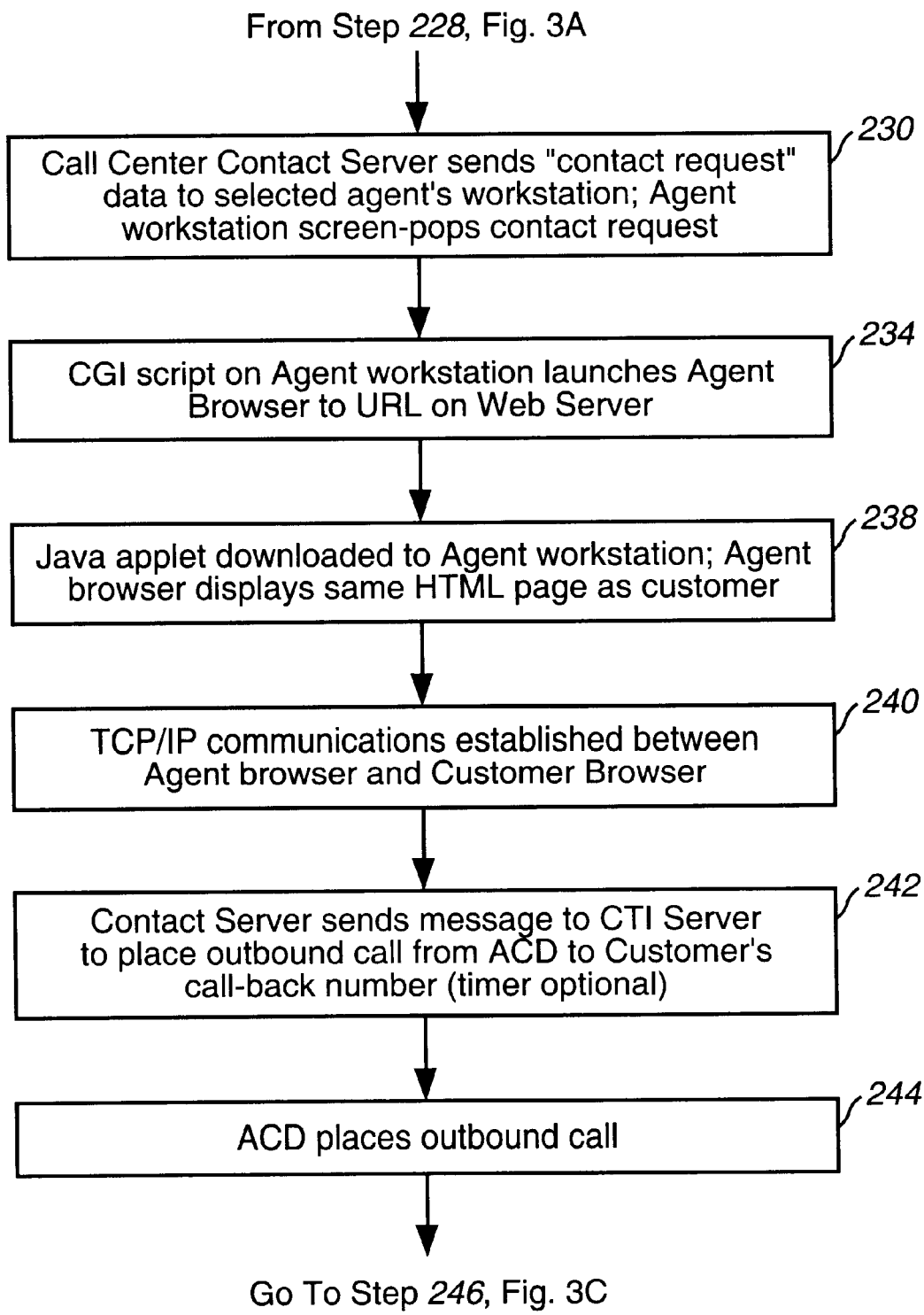
Figure 3C:
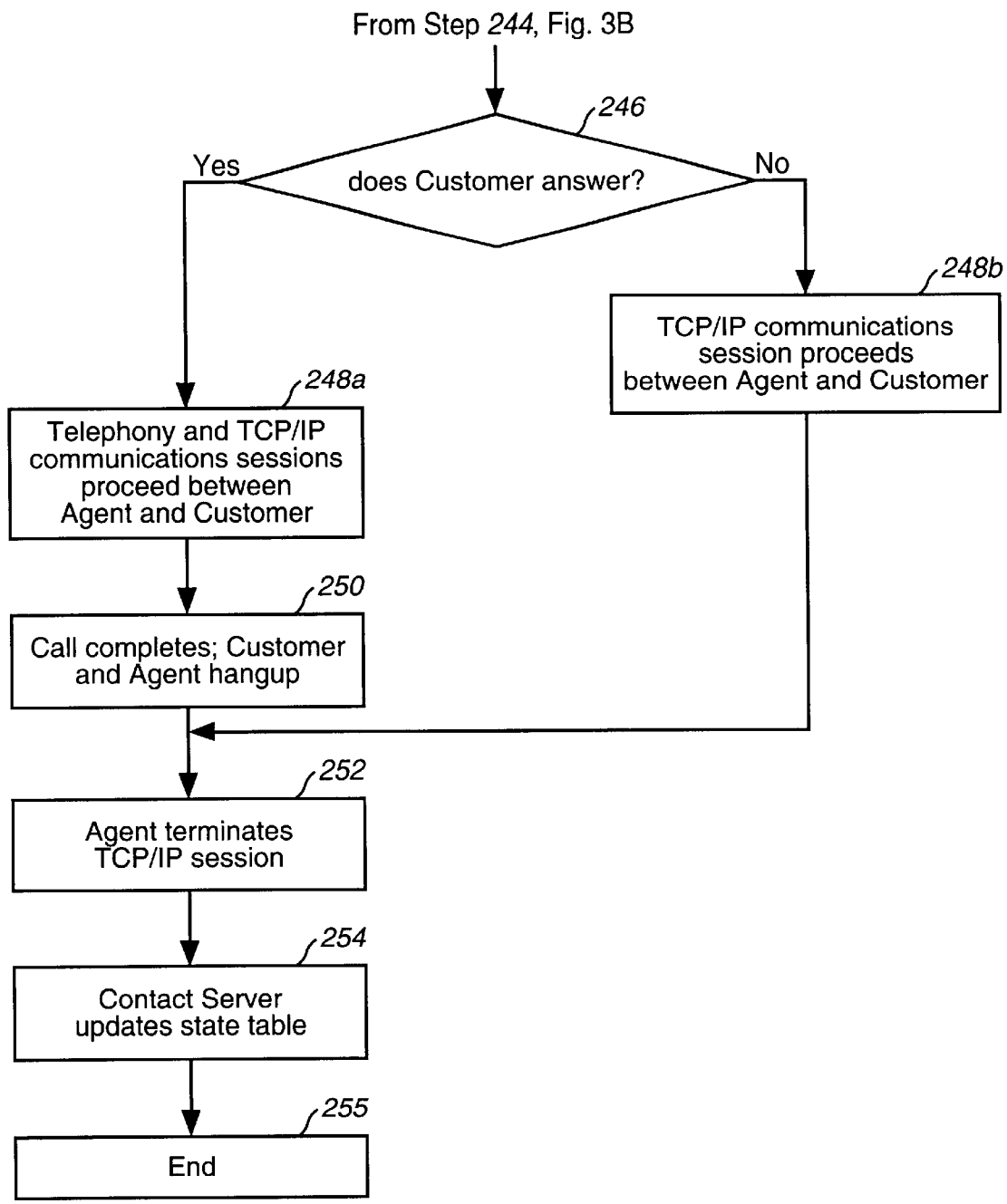

In the preferred embodiment, the Enterprise Contact Server 100 is a computer running specialized software to enable enterprise-level routing of contact requests, so that agents at a plurality of call centers can fulfill customers' contact requests from a single source (e.g., Web page) or to a single telephone number. In accordance with the invention, each center Contact Server 28 constantly sends event messages to the Enterprise Contact Server 100 which event messages are used by the Enterprise Contact Server 100 to track the current states and availability of each resource (agent) across the enterprise. As shown in FIGS. 2 and 3, the Enterprise Contact Server 100 interfaces with a database 134 that includes: skill tables that identify the particular skill profile of each agent; and state tables that identify the current state of each agent. When a contact request is placed by a customer, it is sent to the Enterprise Contact Server 100 which first queries its skills tables to determine a qualified agent. When a qualified agent is found, the Enterprise Contact Server 100 then queries the state tables with the qualified agent i.d. to determine if that agent is currently available. If the qualified agent is not available, the Enterprise Contact Server finds another qualified agent. It then sends the contact request data to the appropriate center Contact Server 28 that supports the call center at which the selected agent is located.

Preferably, standard mid-range computers, such as DEC Alpha 4100 or 8400 servers, can be used for the Enterprise Contact Server 100, Database Server 134, as well as Intranet Web Server 130, Firewall Server 140, and other data sources 136 as will be described.

To enable the enhanced enterprise-level routing functionality, the communications system architecture 101 is further provided with an Enterprise Router 105 functioning as an intelligent call router ("ICR") which is a computer application that provides intelligent routing of inbound calls, e.g., in the manner as described in commonly assigned, co-pending U.S. patent application Ser. No. 08/796,840. Particularly, the Enterprise Router 105 receives call routing requests, i.e., data messages, generated for an inbound call received on a PSTN switch, and processes the request to determine where to route the call. Based on real-time state and availability data received by call centers, the ICR selects an available qualified destination (e.g., agent) to which to route the call. In the preferred embodiment, the Enterprise Router 105 is an application distinct from the Enterprise Contact Server, such as shown in FIG. 2, and is embodied as a distinct software application and database that resides on another computer (different than the Enterprise Contact Server 100). In this embodiment, the Enterprise Contact Server interfaces with the Enterprise Router via an API 110 to enable the use of different types and vendors' offerings of an Enterprise Router. Alternately, the Enterprise router 105 may be a distinct software application and database that resides on the same computer as the Enterprise Contact Server or, it can be integrated with the Enterprise Contact Server application as a process or sub-system. As will be described, the Enterprise Router 105 provides enhanced functionality by enabling a call to be first routed to a VRU using only the DAP which routes all calls for a single number to the VRU. At the VRU an IVR application collects information from the caller which is used by the Enterprise router to further resolve routing. In this manner, an enterprise can use the same telephone number for multiple services and differs from the prior art implementations in which calls are first routed by an ICR based only on the data generated by the call, e.g., DNIS, ANI, time of day, day of week, etc., and wherein the call is only sent to a VRU if it needs to be queued.

As further shown in FIG. 2, a Web/Intranet Server 130 is also provided to support each of the business' Web sites, along with Java applications for use with the present invention. As described herein, at least one process is provided, embodied by a Java application on the Web Server, that receives contact requests submitted by a customer over the Web and sends these contact requests to the Enterprise Contact Server 100 for processing.

The Firewall server 140, is a collection of components comprising a Data Management Zone ("DMZ") that provides a secured interface to the Data Center LAN 31 for public Internet users. It has an identical Web/Intranet Server process running on it; and it is from this Web Server (on the Firewall Server 140) that the Java applets are downloaded to the customer PC and web browser 42. Identical Java applets are downloaded to agent workstations 14 from the Web Server 130.

A Network CTI Server (such as Genesys' Network TServer) 118 is similar to a call center's CTI Server 18, except that its application is extended to the enterprise level. As shown in FIG. 1, unlike the call center CTI Server 18, the Network CTI Server 118 receives call routing requests from a data access point 125 ("DAP") via a 800 Gateway interface component 130 and distributes these requests among a plurality of call center CTI Servers. The 800 Gateway component 130 particularly provides a data interface to the DAP for external call processing systems such as described in co-pending U.S. patent application Ser. No. 08/796,246, the contents and disclosure of which is incorporated by reference as fully set forth herein. More particularly, for routing inbound calls, the PSTN uses the DAP 125 which provides for basic call routing for special service numbers. When a PSTN switch receives a call, it issues to the DAP a service request message which the DAP processes to determine a destination to which to route the call. Typically, the number is based on at least the dialed number and other data, e.g., ANI, time of day, day of week, etc. The enterprise router 105, which is a form of an ICR, provides more enhanced call routing based on real-time data received from the call centers.

The Data Center 31 is a LAN that provides data connectivity among the Web Server 130 and Internet 32 (via the DMZ), Enterprise Contact Server 100, Network CTI Server 118, and the plurality of Call Centers "a"–"n". Specifically, the data center LAN 31 is connected to each call center 11a, 11b, . . . , 11n by respective call center WANs 34a, 34b, . . . , 34n to provide a physical interface among the Enterprise Contact Server 100 and each Center Contact Server 28. FIG. 2 illustrates one possible physical implementation of the logical architecture of FIG. 1 having a first Ethernet LAN 11a and a second Ethernet LAN 31 which provides data connectivity among the various computer components of the call center 10 described with respect to FIG. 1.

The intranet server 166 embodied as a Web Server 130, supports the Web site and TCP/IP communications for whatever services are being supported by the call center, such as the Web site that allows customers access to a trouble ticket database maintained on data base server 37.

A customer, generically illustrated at 42 in FIGS. 1 and 2, who desires to make use of the invention will normally have a Personal Computer (PC) 44 running customized communications and browser software, e.g., Microsoft Explorer® or Netscape Navigator® or Communicator® for IP communications, and a telephone 46. Each agent workstation 14 also runs a Web browser for IP communications, and customer service workflow software, such as Clarify®, for providing customer services.

Java applets may be used in the practice of the invention to support the call-back service and the applets and other features that are stored on and may be downloaded within the company LAN or WAN from the Web Server 130. As mentioned, it is from the firewall server 140 having a Web server process that downloads Java applets to the customer PC 44 and web browser. Identical Java applets are downloaded to agent workstations 14 from the Web Server 130 that runs on the Intranet.

As mentioned, the enterprise contact server 100, in conjunction with the communications system architecture 101 of FIG. 1: supports additional communication means IP telephony, HTTP sessions, etc.; enables use of the same platform for contact requests and inbound calls; and, enables use a single telephone number for multiple services by enabling the data access point ("DAP") to route all calls for a single number to a VRU implementing an IVR application to collect information from the caller which can be used to further resolve call routing.

These scenarios are exemplified in the flow diagrams depicted in FIGS. 3(*a*)–3(*c*) and 4(*a*)–4(*b*).

FIGS. 3(*a*)–3(*c*) together comprise a flowchart illustrating a process for performing enterprise-level routing of a contact request using the Enterprise Contact Server. This shows a specific embodiment of the present invention, in which the call-back service is implemented for a secured Web site that requires user authentication. At the company, the Enterprise Contact Server will be used with a Web site running an application that enables customers to access the company's trouble ticket system and view the status of their tickets. Therefore, each customer has a user profile setup in a profile database on the Database Server. It is from this database that skills designators are obtained.

A similar type of call-back service can be implemented with the Enterprise Contact Server for other applications, not all of which require user login. Additionally, the Enterprise Contact Server can be used to accept call-back requests from sources other than the Internet.

As shown in FIG. 3(*a*), at step 210, a customer logs into a Web site. The Web Server authenticates the customer's user i.d. and password against the customer's user profile, which is stored in a database on the Database Server. If the customer is authenticated, the Web Server sends to the customer browser the HTML file that includes the Web site's home page. Embedded in this file are the Java applets that will be used to establish communications between the agent workstation and the customer PC. The Java applets perform other functions, such as providing a dialog box for initiating a contact request in step 210.

The Web Server 130 maintains a session with the customer browser over the Internet using cookies or other session maintenance technology. This way, when the customer submits a contact request, the Web Server can identify that customer for the purpose of matching the contact request to a qualified agent.

The customer can now browse the Web site. In the exemplary embodiment described, a customer is operating within a trouble ticketing system to view the status of his/her trouble tickets. During the course of reviewing trouble tickets, the need arises which requires a customer to communicate with a service rep (call center agent), e.g., to ask a question or some other reason.

In step 212, the customer selects the contact request (call-back) feature, which is typically an HTML button on a Web page. This causes a dialog box to be presented to the customer to prompt him/her for their name and call-back telephone number. The call-back telephone number can also include an extension, so that if the customer is calling from a PBX and an operator (live or automated) answers the phone on the call-back, the call center agent will know the extension needed to reach the customer.

Additional information can be solicited here as well, such as a customer identifier that can be used as a skills designator to match the call-back request to a qualified agent. A call-back time can be solicited, to state when the customer would like to be called back. Call-back time can be entered either as a specific clock time (i.e, 3:00 pm est), or as a duration (i.e., 20 minutes from now). Without a call-back time entered, it is assumed the customer is requesting a call-back as soon as possible.

In step 214, when the customer has selected the contact request and has completed the contact request dialog box and hits enter, the customer browser sends the call-back request to the call center Web Server, via the Internet, as indicated at step 216.

At step 218, the Web Server 130 receives the call-back request and forwards it to the Enterprise Contact Server via the Data Center LAN 31. In addition to the information provided by the customer in step 210, the Web Server includes in the contact request message that it forwards to the Enterprise Contact Server: the IP address of the customer, the URL of Web page from which the call-back request was selected, and, the customer identifier of the customer. The customer identifier is obtained from the customer's user profile when the customer logs on in step 210. Thus, the customer's IP address and the URL will be provided to the agent workstation.

In step 220, the Enterprise Contact Server queries the skills database with the skills designator (i.e., the customer identifier) to find a qualified agent; that is, an agent listed with that particular skills designator. The Enterprise Contact Server actually identifies all agents with that skill, so that if one agent is not currently available, another agent can be used.

In step 222, the Contact Server queries the state table to find an available agent with the highest skill level of the needed skill. These state tables are constantly updated with data that the Enterprise contact Server receives in event messages from each center contact server.

In step 224, a determination is made as to whether a qualified agent is available. If at step 224 it is determined that a qualified agent is not available, then the Enterprise Contact Server proceeds back to step 222 to query the state table until a qualified agent is available. Alternately, a queuing/monitoring method may be established comprising the steps of: placing the contact request on a call-back queue on the Database Server 134; monitoring the call-back request queue and state tables; and determining if a qualified agent is available to take a call-back request in queue, as described in co-pending U.S. patent application Ser. No. 08/976,162. It should be understood that this queuing/ monitoring step may include the step of applying business rules.

If at step 224 it is determined that a qualified agent is available, then the Enterprise Contact Server will send the contact request to the call Center Contact Server 28 of the call center having the qualified agent, e.g. Call Center A, as indicated at step 228. Then, at step 230, FIG. 3(*b*), the Contact Server sends the contact request to the select agent workstation 14 via the call center LAN, e.g., LAN 11*a*. This request includes all information entered by the customer, as well as the customer's IP address and the URL of the Web page from which the contact request was placed. The selected agent workstation, when it receives the contact request, screen-pops the contact request in a window displaying the customer's name, call-back number, and perhaps other information entered by the customer.

The selected agent workstation then processes the contact request, in the manner such as described in co-pending U.S. patent application Ser. No. 08/976,162. For example, as shown at step 234, FIG. 3(*b*), this processing may entail: downloading a Common Gateway Interface ("CGI") script from the Web Server for execution on the agent workstation to launch the agent's browser. In this step, the URL is passed as a parameter to the CGI script which can then be used to build the same Web page that the customer was at when the contact request was placed. In reference to FIG. 2, the agent browser retrieves Web pages from a Web Server on the Intranet/Web Server 30, while the customer retrieves identical Web pages from an identical Web Server on the Firewall Server. Then, at step 238, a Java applet is downloaded to the agent browser from the Web Server on the Intranet Server. The customer's IP address is passed as a parameter by the CGI script. The agent browser displays the same Web page as the customer browser.

In step 240, the Java applet that was downloaded in step 136 establishes and maintains TCP/IP communications between the agent browser and the customer browser, using the customer's IP address that was included in the call-back request sent to the agent workstation, and, at step 242, the Contact Server 28 sends a message to the CTI Server to cause the ACD to place an outbound call to the customer's call-back number. As noted in reference to FIGS. 1 and 2, this can occur in any of a number of ways and at any of a number of points in the process. In the preferred embodiment, the Contact Server will send this message at the same time it sends the contact request to the agent workstation, in step 234. Alternately, the Contact Server can set a timer in step 234. When the timer expires, step 242 is triggered.

In step 244 and in response to the message sent by the Contact Server in step 242, the ACD places an outbound call to the customer's call-back number. The call is placed from the agent's telephone station, so that the agent's telephone line to the ACD is seized during this process. The customer may or may not answer, as determined in step 246.

If the customer answers, then in step 248*a*, both telephony and TCP/IP communications sessions proceed between the agent and the customer.

In step 250, the call completes and the customer and agent each hangup.

Referring back to step 246, if the customer does not answer, then in step 248*b*, a TCP/IP communications session can still proceed between the customer and agent. In fact, an on-line chat session can replace a telephone call.

In step 252, the agent terminates the TCP/IP session. In step 254, the Contact Server updates the state tables to show the agent is now available.

The Enterprise Contact Server could also select only a call center that had an available qualified agent, without select-ing the actual agent. The Enterprise Contact Server would then send the contact request to the selected call center's Center Contact Server, and the Center Contact Server would then select the actual agent.

Referring back to FIG. 3(*a*), in an alternate embodiment, when the Enterprise Contact Server 100 receives a contact request at step 218, it may select a call center that has qualified agents. Certain other criteria may be used to select one from many call centers with qualified agents, such as the call center with the most qualified agents. The Enterprise contact server may then send a status query to the call center Contact Server for that selected call center. That Center Contact Server 28 returns a response indicating if a qualified agent is available. If so, that Center Contact Server receives the contact request. If not, the Enterprise Contact Server selects another call center.

As yet another alternate embodiment, when the Enterprise Contact Server 100 receives the contact request at step 218, it may select all call centers having qualified agents. The ECS then sends a status query to the Center Contact Servers for all selected call centers. The first Center Contact Server to return a positive response indicating that a qualified agent is available will receive the contact request.

Figure 4A:
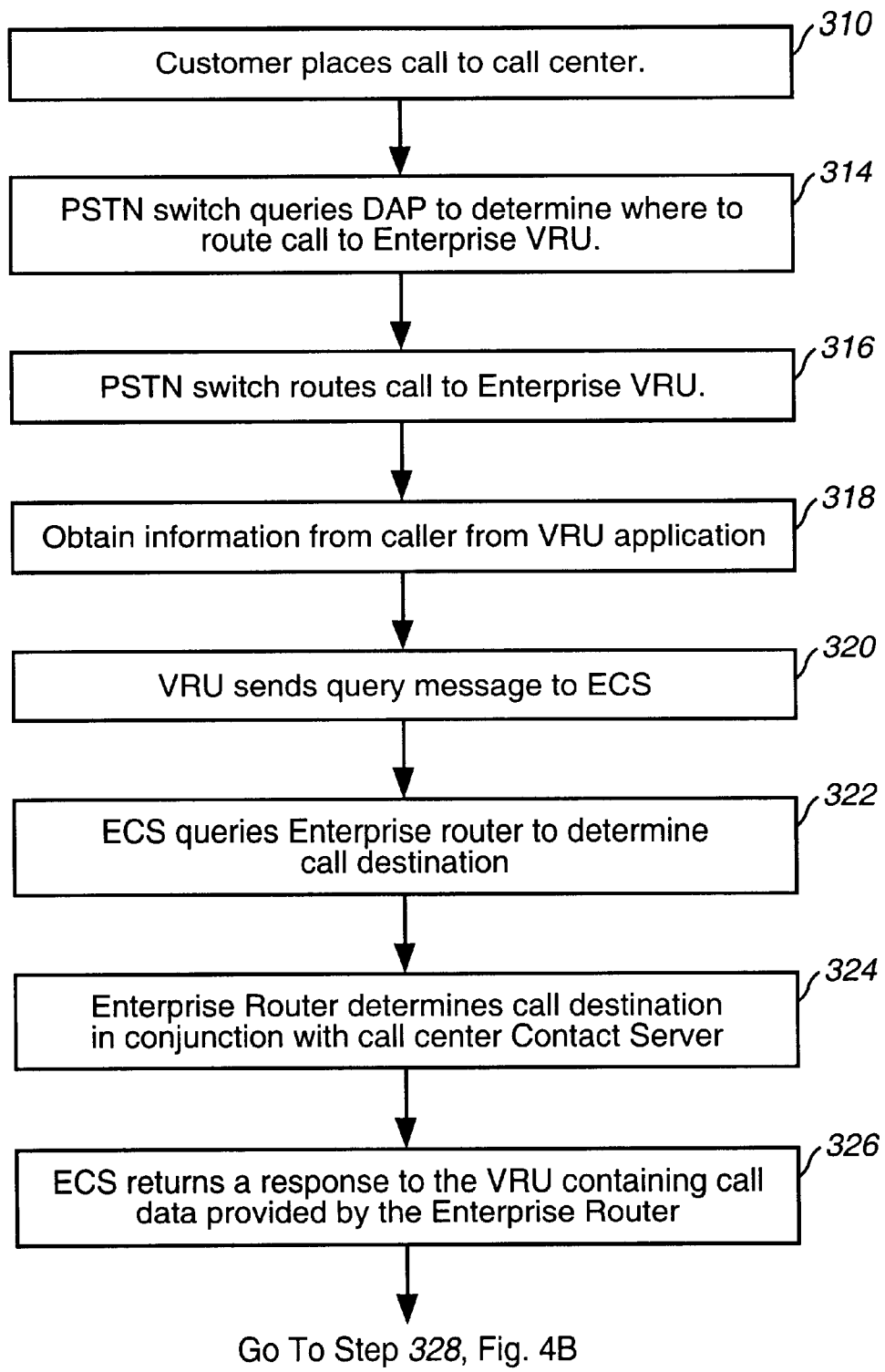
FIGS. 4(a)–4(b) illustrate the process for placing, processing, and routing inbound calls via the PSTN, or other similar communications means for placing an inbound call.
Figure 4B:
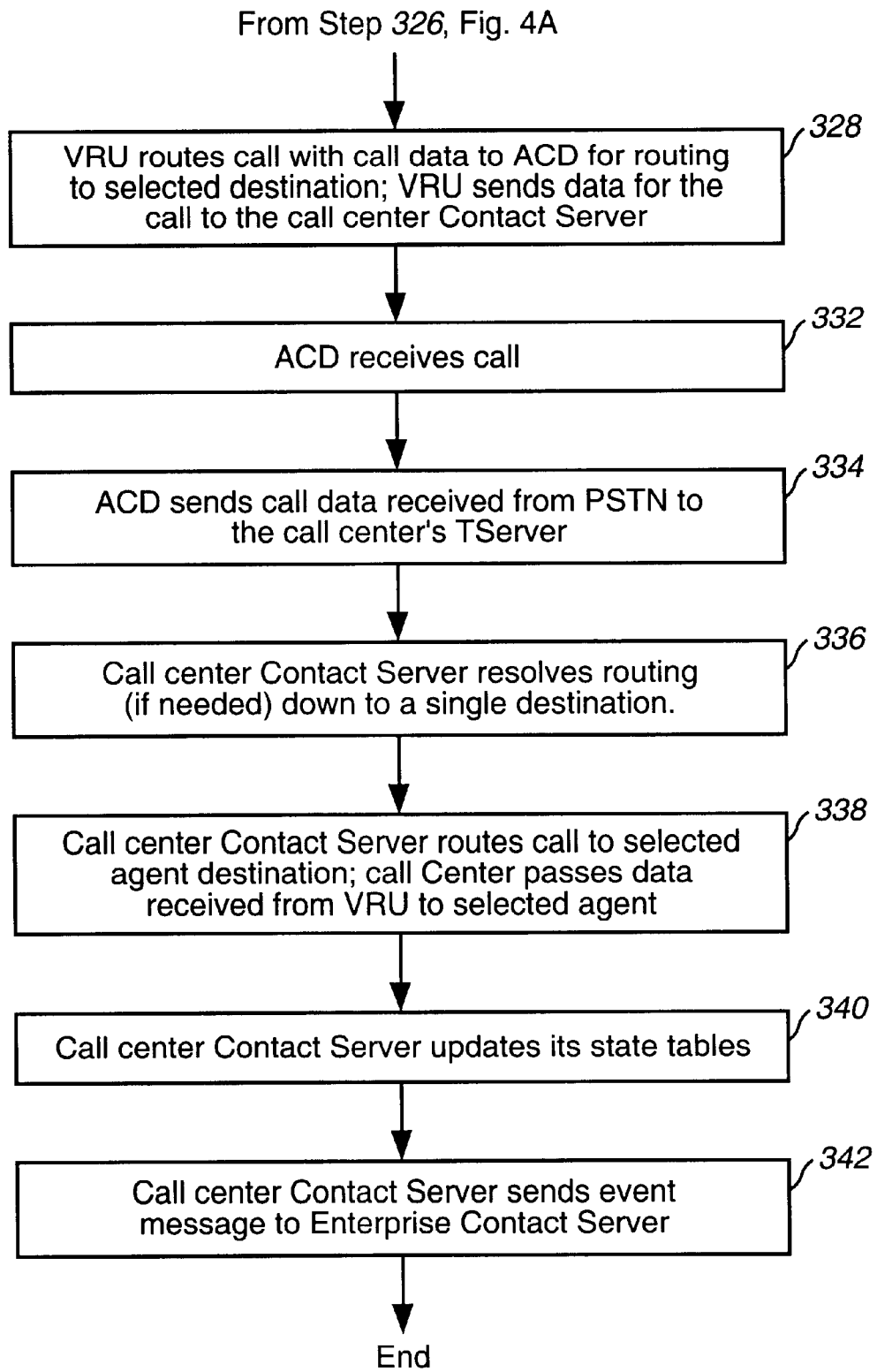

FIGS. 4(*a*)–4(*b*) illustrate the process for placing, processing, and routing inbound calls via the PSTN, or other similar communications means for placing an inbound call.

In the described process, it is assumed that the received call is an 1-800 toll free call.

As shown at step 310, FIG. 4(*a*), the customer first places a call to a call center. The call is carried by the PSTN switch which, in response, queries the DAP to determine where to route the call. The DAP performs a call processing application to resolve routing to an Enterprise VRU. If a plurality of Enterprise VRUs are used, routing may be resolved to a single VRU, or even a single port or port group on a VRU, based on any of a number of criteria; for example, dialed number, ANI, time of day, day of week, load balancing algorithms, etc. Then, as indicated at step 316 the call is routed by PSTN to the Enterprise VRU, and, as indicated at step 318, an interactive voice response application on the VRU is executed to collect information from the caller. This information is used to determine an appropriate destination for the call. As indicated at step 320, the VRU then sends a query message, including information collected from the caller, to the Enterprise Contact Server which then queries the Enterprise Router, as indicated at step 322. As mentioned, the Enterprise Router may be a sub-system integrated with the Enterprise Contact Server, or, preferably, is a distinct process that can run on the same or different computer than the Enterprise Contact Server.

As indicated at step 324, the Enterprise Router then determines an appropriate destination for the call, based on services needed, skills of agents, and availability of agents. A destination may be a call center, a group of agents at a call center, or a particular agent at a call center. In the preferred embodiment, resolution of routing down to a particular agent is a process that can be distributed between the Enterprise Router and a Center Contact Server. That is, routing parameters (used to determine where to send each inbound call or contact request) could be the same on both the Enterprise Router and each Center Contact Server, or could be distributed among them. For instance, the Enterprise Router can perform high-level routing (e.g., only to a call center) based on certain parameters, while the Center Contact Server 28 resolves routing at a more detailed level (e.g., to a particular agent) based on certain other parameters. For example, the Enterprise Router could determine an agent skillset needed and a call center that has agents with that skillset, and have the call routed to that center. The Center Contact Server at that center then determines an available qualified agent to handle the call.

Next, as indicated at step 326, the Enterprise Contact Server returns a response to the VRU comprising the call data provided by the Enterprise Router. The type of data returned includes, but is not limited to, the following: data for routing the call (e.g., type or skillset of agent needed to handle call, which call center has such agent available), and data pertaining to the caller or service (e.g., billpayer i.d., customer account data, caller-selected options). Next, as indicated at step 328, FIG. 8(b), the Enterprise VRU attaches data to the call and routes the call to the ACD of the selected call center destination. Concurrently, the VRU sends data for the call to the destination call center Contact Server.

It should be understood that steps 322–324 provides a distinct advantage over prior art in inbound call routing. Since the VRU collects information from the caller to determine an appropriate destination for the call, the same telephone number can be used for multiple services. Resolution of routing to a particular service is made by the Enterprise Contact Server and Enterprise Router, based on the information collected by the VRU, as opposed to first routing a call to its appropriate destination, based on processing by the DAP and/or an ICR which is limited only to information provided in call-generated data, such as dialed number and ANI. Thus, a single number cannot be used for multiple services.

Additionally, in view of FIG. 8(b), at step 332, the ACD receives the call, and, at step 334, the ACD sends call data to the call center's CTI Server, which passes data to the call center Contact Server. It should be understood that this is not data that the VRU sent to Center Contact Server in step 328, but data received with a call over the PSTN, i.e., dialed number, ANI, CIC, etc. In the manner such as described in co-pending U.S. patent application Ser. No. 08/976,162, the call center Contact Server resolves routing down to a single destination, i.e., a selected agent, as indicated at step 336. The Center Contact Server also reserves that agent, and updates its state tables accordingly (to designate the agent as reserved).

Finally, as indicated at step 338, the call is routed to the selected agent's teleset. At the same time, the T-server sends an event established message identifying to which agent the call was sent. The Contact Server receives the notification, and at step 338 additionally routes the data that the Center Contact Server received from the VRU (at step 328) to the selected agent's workstation, which now has all the information necessary to process the request. The Center Contact Server updates its state tables accordingly (to designate the agent as unavailable) as indicated at step 340, and sends an event message to the Enterprise Contact Server at step 342 regarding the unavailable status of the selected agent.

Figure 5:
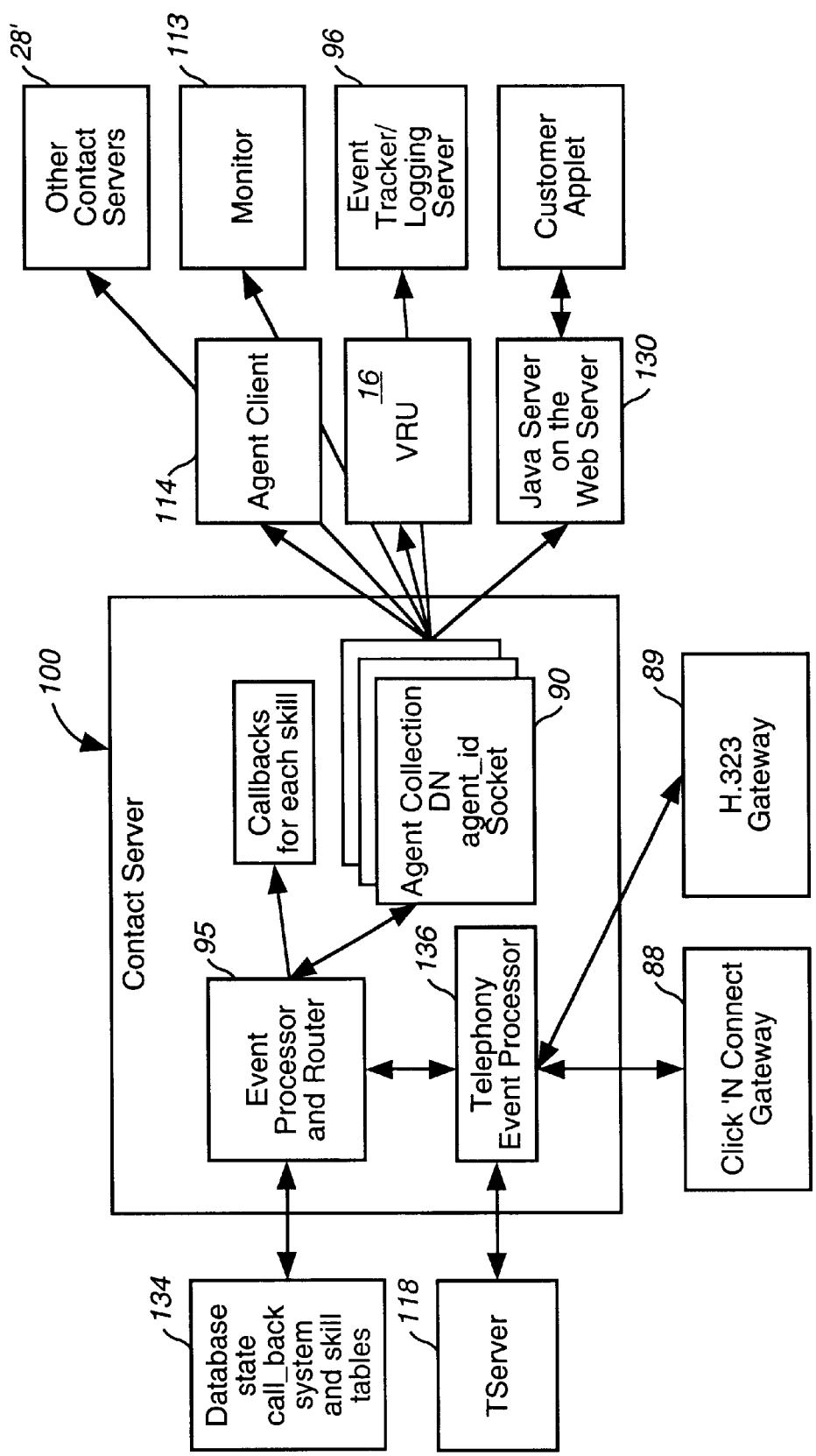
FIG. 5 is a diagrammatic illustration of the Enterprise Contact Server of the present invention and the components with which it interacts.

FIG. 5 illustrates the process interfaces to the Enterprise Contact Server 100 within the communications system architecture. The fundamental software architecture is similar between the Enterprise Contact Server 100 and the Center Contact Server. Differences are implemented as new API function calls for messaging included within the Agent Collection module 90, and routing rules, which are embodied in a configuration file and software code within the Event Processor and Router module 95.

For instance, each time an event is processed by a Contact Server, e.g., routing a call to an agent, the Contact Server sends out an event message which is routed over a call center LAN 11a, . . . , 11n and over the corresponding WAN 34a, . . . , 34n to any "client" who has registered for receipt of this type of message. Particularly, the Enterprise Contact Server 100 registers itself with each call center Contact Server for receipt of event messages. In this way, the Enterprise Contact Server can keep track of current states and availabilities of each call center resource, in order to do enterprise-level routing of contact requests and inbound calls. Additionally, Contact Servers may register with each other to communicate certain messages.

While most of the API function calls between the Center Contact Servers are the same as described in co-pending U.S. patent application Ser. No. 08/976,162, messaging between each Center Contact Server and the Enterprise Contact Server makes use of additional API function calls. Additionally, since the Enterprise Contact Server performs enterprise routing among the multiple Center Contact Servers, i.e., the Enterprise Contact Server sends contact requests to a call center Contact Server, and API function calls are added to enable this. Appendix A provides Agent/Client API tables listing the events, possible sources of each event, and actions taken by the Contact Server and Enterprise Contact Server in updating the above state table.

Unlike the call center Contact Server, the Enterprise Contact Server 100 is able to route contact requests to other Contact Servers by implementing both the routing rules employed by the Event Processor and Router module 95, as well as the parameters used to perform routing. For instance, in the above-described inbound call routing scenario, at step 324 in FIG. 8(b), the parameters used for routing by the Enterprise Contact Server differ from those used by a Center Contact Server. Depending on a specific implementation, the Enterprise Contact Server can route a contact request or inbound call to a call center only, to a group of agents at a call center, or to a specific agent at a call center. The Center Contact Server must ensure the routing is resolved all the way down to a specific agent, so it picks up where the Enterprise Contact Server leaves off. Even in an example case where the Enterprise Contact Server 100 routes down to a specific agent, e.g., step 324, (FIG. 4(a)), the Center Contact Server still gets queried by the ACD (via the TServer) at step 334 under FIG. 4(b). This is because the Center Contact Server knows to which agent the call is to be routed, based on information received at step 328, FIG. 4(b) which the ACD does not know. The Center Contact Server is what actually sends the instructions to the ACD to route the call to the selected agent. Also, the Center Contact Server needs to first ensure the selected agent is available, prior to updating its state tables and sending out an event message. [Please verify this and confirm steps of FIGS. 4a–4b]

The communications system architecture implementing the enterprise contact server 100 of the invention, can be used to provide telephone call-backs. Specifically, the customer visits the specified web site, which causes the callback applet to be downloaded to the customer browser. The customer enters the phone number that they desire to receive a callback on and then clicks on a "Call Me" button on the web page (html) display. This action sends a request to the Enterprise Contact Server 100 to insert the callback into a queue. The Enterprise Contact Server then sends a request to insert the callback to the appropriate Premise Contact Server. The Premise Contact Server responds with the average handling time for the calls in its queue, which the Enterprise Contact Server 100 sends back to the customer. When an agent with the appropriate skills becomes available, the callback is sent to the agent at the selected call center and a screen-pop is triggered so that the available agent may preview the request prior to processing the callback. This results in a notification to the customer that the call is being processed. It also results in requesting the T-Server to connect an outbound call between the agent=s teleset and the customer entered phone number through the ACD.

Furthermore, the communications system architecture implementing the enterprise contact server 100 of the invention, can be used to provide telephone call-backs. For instance, when the agent is on line with a customer the agent's Screen Pop application displays the customer information. The agent may determine the need to transfer the call to another Call Center. To accomplish this, the agent depresses a transfer button (not shown) on the Screen Pop application and enters a number, e.g., an 8XX number, of the Call Center to which the call is to be transferred. The agent additionally initiates the attachment of data to the call. Via the screen pop application, an event transfer is performed whereby the call is sent to the premise Contact Server, which, in turn, sends the request to transfer to the premise T-Server. The premise T-Server then transfers the call to the requested extension. The premise Contact Server additionally sends a transfer call to the Enterprise Contact Server with an identifier for the Call Center that the phone call is being transferred to. The transfer event will also contain the customer identifier. The Enterprise Contact Server 100 then sends the transfer event to the appropriate premise Contact Server, which preferably, will have received the transferred call. The new premise Contact Server will deliver the transfer event to an agent with the appropriate skills and availability, along with the customer identifier. When the agent's Screen Pop receives the transfer event, the customer display information will be displayed to the agent, as well as a message informing the agent they are receiving a transferred call. The new premise T-Server will also deliver the transferred call to the same agent's teleset.

As shown in FIG. 5 there is provided additional interfaces to the Enterprise Contact Server 100. These interfaces include: an Event Tracker 96 for receiving and logging all events into database 134 or data warehouse, primarily for the purpose of historical data tracking and statistics generation; a Click-'n-Connect Gateway interface 88 enabling IP traffic to be converted into PSTN traffic; and, an H.323 Gateway 89 used to support video calls, as defined by the H.323 industry standard. This H.323 Gateway is for the purpose of enabling a customer to request a contact by an agent via a video conference, i.e., over the Internet via an H.323 gateway. Since the Click-'n-Connect Gateway 88 and H.323 Gateway 89 are to support enhanced telephony communications for contacts, their interfaces are processed by the Enterprise Contact Server's Telephony processor 136.

Further interfacing with the Enterprise Contact Server is an agent/call monitor 113 ("Monitor") which provides displays of current and historical agent and call states, and various other statistics from the event tracker/logging server 96; and, an interface to an agent workstation "Agent Client." While in the preferred embodiment, the Enterprise Contact Server does not interface directly to any agent workstations, the Enterprise Contact Server is based on the software architecture of the Center Contact Server, and consequently, supports such an interface. In fact, the Agent/Call Monitor can interface to the Enterprise Contact Server as an Agent Client.

Figure 6A:
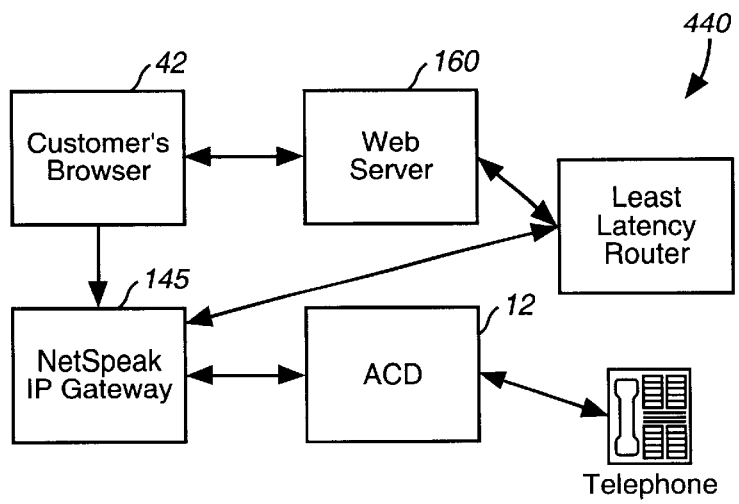
FIG. 6(a) illustrates an exemplary architecture of an enterprise "Click-'n-Connect" system 440.
Figure 6B:
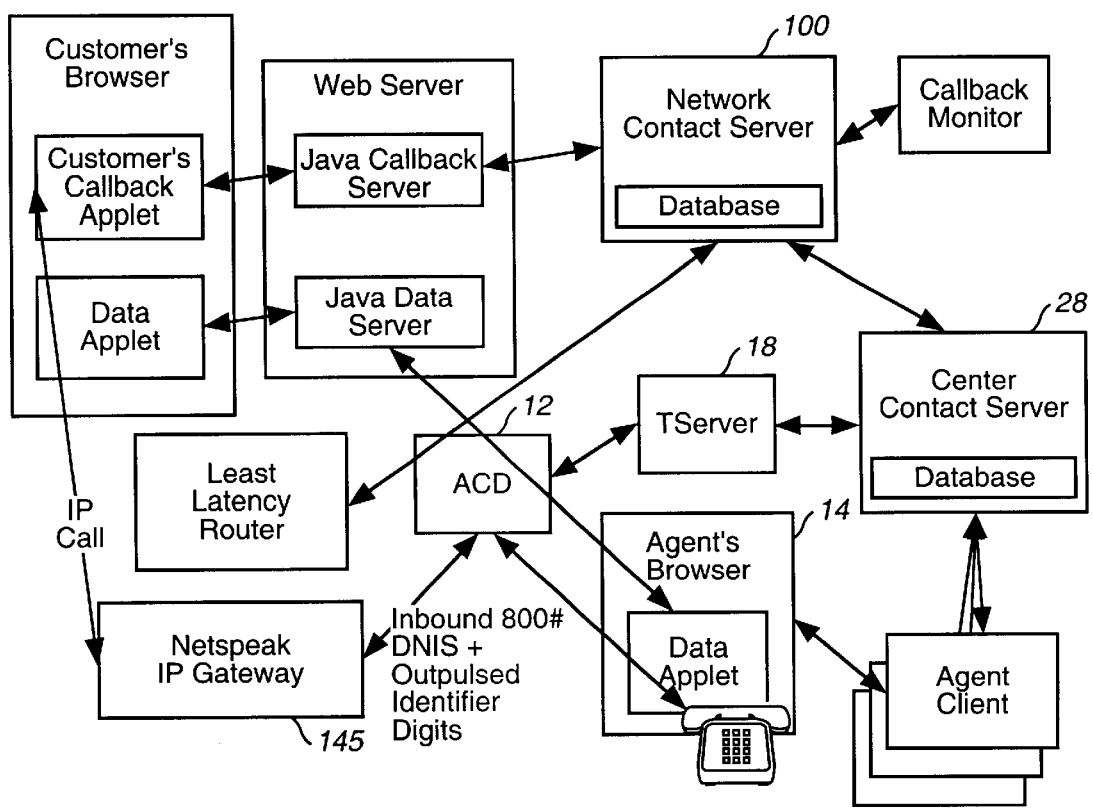
FIG. 6(b) illustrates an exemplary logical architecture for Click-'n-Connect.

FIG. 6(*a*) illustrates an exemplary logical architecture of an enterprise "Click-'n-Connect" system 440. The Click-'n-Connect system 440 enables a customer 42 browsing a Web site to select an option to contact a call center agent with an IP telephone call. When this option is selected, the Click-'n-Connect Web Server 160 captures the customer's IP address, sets up an IP telephony session with an IP Gateway 145, e.g., Netspeak, and initiates a telephone call over the PSTN to a call center ACD using a pre-programmed 1-800 routing number. The call is routed to a qualified agent, who then engages in a PSTN-to-Internet telephone call with the customer. If no qualified agent is available, the call is held in a queue on the ACD 12. In the architecture depicted in FIG. 6(*a*), only a voice telephony session can be established, and no synchronized HTTP sessions or multi-media collaboration such as URL push are supported. Furthermore, a customer cannot place a call-back request.

FIG. 6(*b*) illustrates the logical architecture for Click-'n-Connect using the Enterprise Contact Server 100 and call center Contact Server 28. Though this service can be supported with a single call center Contact Server as described in co-pending U.S. patent application Ser. No. 08/976,162, the Enterprise Contact Server 100 adds to this service the features and benefits previously described. Specifically, when a customer selects the Click-'n-Connect option from a Web page, the Web Server 130 sends a message to the Enterprise Contact Server ("Network Contact Server") 100. The Enterprise Contact Server selects an available qualified agent (or a call center with a qualified agent available), and sends a message to that agent's center Contact Server 28 to reserve (or select and reserve) an agent. The Enterprise Contact Server 100 also establishes an IP telephony session with the IP gateway 145, and initiates a call to the ACD 12. The call is routed to the selected agent, who then engages in a telephone call with the customer. Likewise, the agent can engage in other sessions, such as synchronized HTTP over the Web.

If no qualified agent is available, then the Enterprise Contact Server 100 submits a contact request to itself, and routes that request to a selected call center Contact Server. The advantages that the Enterprise Contact Server 100 introduces for this application are: sessions other than voice telephone call are supported; a customer's call is not held in queue at the ACD if no agent is available; and, multiple call centers can be used to take calls or contact requests.

It should be understood that the enterprise contact server and communications architecture of the invention can be used as a Web Dispatch service 400 which allows customers of the enterprise to view trouble ticket information via a Web site. Specifically, if a customer has a question concerning a trouble ticket, they click an option on a Web page, which issues a contact request to a call center agent who supports the system for which the trouble ticket was submitted. With the Enterprise Contact Server 100 and systems architecture of the invention, contact requests can be distributed among multiple call centers. Thus, when a contact request option is selected by a customer, a Customer Callback Applet (Java) executes on the customer's computer, as described in co-pending U.S. patent application Ser. No. 08/976,162. A contact request is sent to the Java Callback Server on the Web Server 130, which forwards the contact request to the Enterprise Contact Server 100. The Enterprise Contact Server 100 queries its skills and states tables, in the manner described herein, and selects a call center or call center agent to which to send the contact request. It sends the contact request to the center Contact Server that supports the selected call center. The Center Contact Server assigns an agent and routes the contact request data to that agent's workstation. The agent can then initiate a synchronized HTTP session with the customer, via the Java Data Server, as described in co-pending U.S. patent application Ser. No. 08/976,162.

Figure 7:
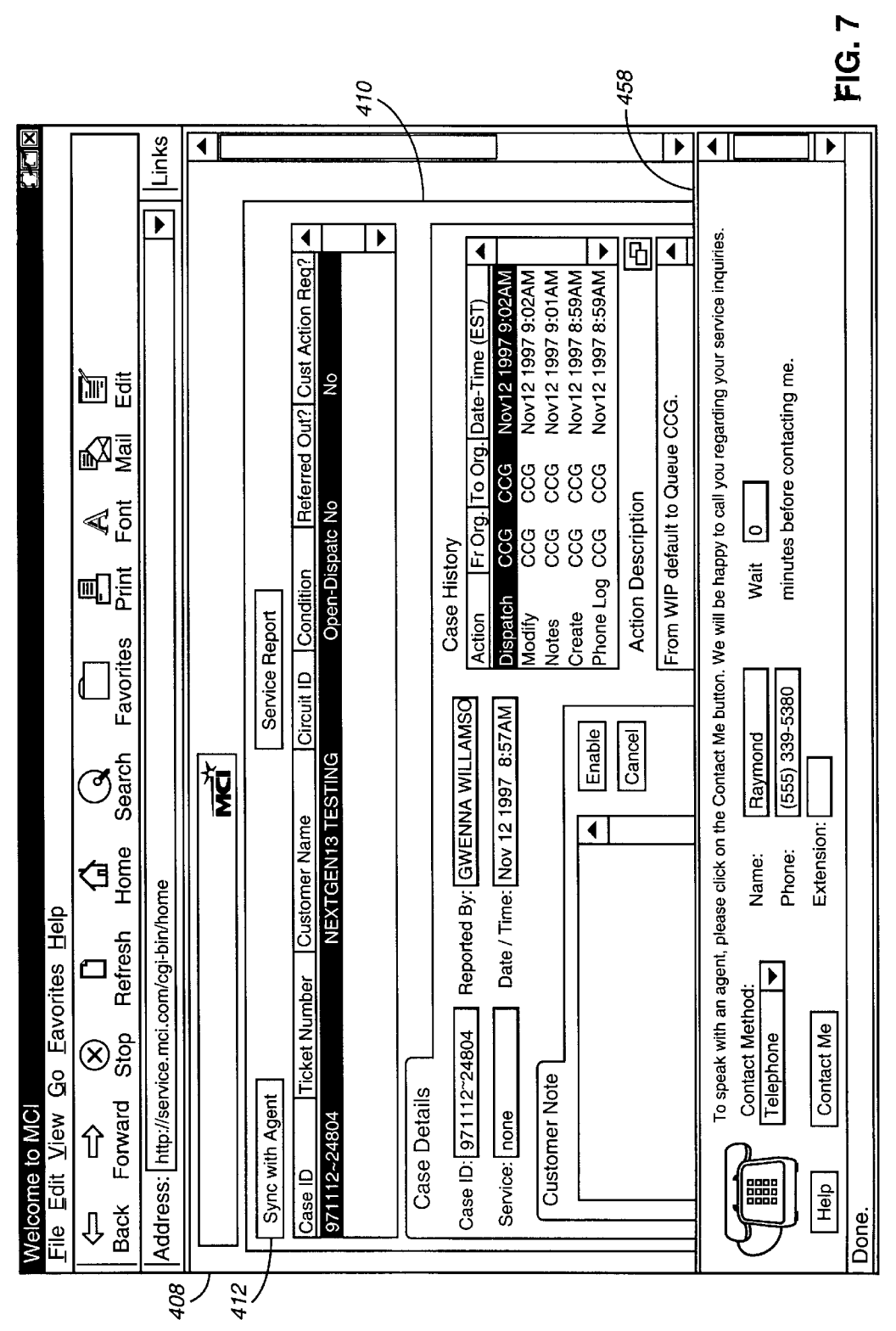

FIG. 7 is a representative illustration of a sample HTML web page 408. Typically, a web browser such as Microsoft Explorer® or Netscape Navigator® or Communicator® displays a HTML web page such as the one shown in FIG. 7 by downloading a HTML file from a Web Server specified in URL. Additional pages may be displayed on top of the HTML web page 408 by Java applets that are also downloaded from the Web Server and running on a client browser. Shown in FIG. 7 are two separate frames overlaid on the html web page 408: a "Trouble ticket" frame 410; and a "Contact Me" frame 458, which enables a call back request. Both of these frames are controlled by the Java applets downloaded from the Web Server.

"Trouble ticket" frame 410 is an example of what a customer may be viewing on their web page before a call back request is made. This frame 410 also illustrates an example of how a customer may request to be synchronized with an agent by pushing on the "Sync With Agent" button 412. Sync, Push, and Pull mechanism is explained in detail in reference to co-pending U.S. patent application Ser. No. 08/976,162.

"Contact Me" frame 458 is controlled by a Java applet running on the Client browser. This Java applet handles call back screen interface with the user and at the same time handles communications with the CallBack Server in the Web Server. The following paragraphs describe a detailed example of how a CallBack Java Applet may function in interfacing with the user and a Server.

Description of CallBack Java Applet Running on Client Browser:

1. Initialize all data parameters.
2. Get I/O connection from host (i.e., CallBack Server).
3. Get host parameters and port address for communication over socket.
4. Construct "Contact Me" screen and display it on Client's current screen.
5. Handle input events from the Client's screen; i.e., mouse input, keyboard input.
    5.1 If input event is a mouse click on a Name field, display message, "enter your name."
    5.2 If input event is a mouse click on a Phone Number field, display message, "enter your phone number".
    5.3 If input event is on a Contact-Method field and the Contact Method chosen is "Telephone," enable phone number and extension fields on the Client's screen; for all other Contact Method chosen, disable phone number and extension fields.
    5.4 If CallMeButton click event, then check if all the input parameters are entered.
        5.4.1 If input parameters are missing, display message "Not enough information to complete call;" and return to step 5, and handle more input.
        5.4.2 If all the input parameters are entered, proceed to step 6.
6. Parse input parameters.
7. If Contact Method chosen is "Agent/Customer On Line Chat," include CGI script name in the URL path to be sent over a socket to CallBack Server; package input parameters into a buffer and write buffer over the socket connection to CallBack Server.
8. If Contact Method chosen is "E-Mail," include Customer's e-mail address in a send buffer; write buffer over the socket.
9. If Contact Method chosen is "Telephone," include Customer's telephone number in a send buffer; write over the socket.
    9.1 Wait for CallBack Server to send confirmation that call has been placed.
        9.1.1 If no confirmation arrives from the CallBack Server in a definite time-out period, display message, "There has been an error in receiving confirmation that your call has been placed," on Client's screen.
10. Listen over the socket for messages from the CallBack Server. (A new thread)
    10.1 If message received from the CallBack Server is "Contact Server Down," display message on the Client's screen, "Call me back function is not available."
    10.2 If message received from the CallBack Server is "Contact Server Up", display message, "To speak with an agent, please click on the Contact Me button. We will be happy to call you regarding your service inquiries."
    10.3 If message received is "Event," parse the message received and compare even types.
        10.3.1 If event type is "Insert Call Back," display message, "Thank you for using MCI Web Callback Service. Your call has been placed and an MCI Technical Specialist is contacting you now."
        10.3.2 If event type is "Delete Call Back", display message, "Your call has been canceled."
    10.4 Proceed to step 10.

Description of CallBack Server Running in Web Server:
One of the functions of this CallBack Server is to interact with the above CallBack applet.

1. Open connection with Contact Server.
2. If no connection, set a parameter "Contact Server Down," package message into a buffer and send to CallBack applet.
3. If connection exists, set a parameter "Contact Server Up," package message into a buffer and send to CallBack applet.
4. Open connection with CallBack applet. (A new thread)
5. Accept data from CallBack applet.
6. Parse message from CallBack applet.
    6.1. If Callback service was requested, call JContactClient class with event type set to "InsertCallBack."
    6.2. If cancellation of callback service was requested, call JContactClient class with event type set to "DeleteCallBack."

The foregoing merely illustrates the principles of the present invention. Those skilled in the art will be able to devise various modifications, which although not explicitly described or shown herein, embody the principles of the invention and are thus within its spirit and scope.

APPENDIX A

CContactEvent Class:

The CContactEvent class is a wrapper class that wraps socket and TServer data. The class includes of 25 protected member variables:

| | | |
|---|---|---|
| m_AgentID | CString | Unique identifier for a particular agent. |
| m_Ani | CString | Telephone number for the requested callback. |
| m_CollectedDigits | CString | Caller entered digits on a VRU. |
| m_DefaultData | CString | Data attached to every call. |

-continued

| | | |
|---|---|---|
| m_Dnis | CString | Dial number identification service. |
| m_ErrorMessage | CString | Description of error that has occurred. |
| m_OtherDN | CString | Destination number (DN) a call was transferred from |
| m_OtherQueue | CString | Queue a call was transferred from |
| m_TeleEvent | CString | Description of request/event correlating to TMessageType enum located in Ttypes.h. |
| m_ThisDN | CString | Current DN. |
| m_ThisQueue | CString | Current queue. |
| m_UserData | CString | Data specific to this event |
| m_IP | CString | URL related to specific callback. |
| m_CallID | long | Switch's unique identifier for a call. |
| m_CallType | long | Refers to Web Phone, Telephone, See You See Me |
| m_ConnID | long | T-Server's unique identifier for a call. |
| m_ErrorCode | long | Numeric code for error that has occurred. |
| m_FileHandle | long | Voice mailbox file. |
| m_OtherTrunk | long | Trunk a call was transferred from. |
| m_UserRefNumber | long | Number of requests related to this event. |
| m_ThisTrunk | long | Current trunk. |
| m_TimeInQueue | long | Amount of time a call/callback has waited in queue |
| m_Event | short | Numeric code correlating to TMessageType enum from Ttypes.h. |
| m_LastCollectedDigit | short | Last caller digit entered on VRU. |
| m_LoginType | short | Type of login used: DN, PCLogin, ACDLogin, Other |

CContactEvent Functions:

Constructors: The class includes two constructors. The first is a standard default constructor taking no parameters and performing no additional tasks. The second constructor takes one CString parameter which is pipe ("|") deliminated. This constructor sets the member variables by calling the GetKeyValue( . . . ) function to parse out the data from the CString parameter passed to it.

void SetVariableName( . . . ): The CContactEvent class includes 25 functions to set, or assign, the value of each member variable, one function per variable. Each function takes one parameter of the same type as the member variable that it corresponds to, sets the variable, and has a returns void.

type GetVariableName( ): The CContactEvent class also includes 25 functions to get, or return, the value of each member variable, one functions corresponding to each variable. These functions do not take any parameters, and returns the value stored within the corresponding member variable.

CString GetSocketString( ):

This function returns a CString of "|" deliminated key-value pairs to send on a socket to a listener/server. The key-value pairs that the function deliminates are the member variables of the CContactEvent class. The function will test each member variable to determine it is populated. If populated, it will add the variable key and its data to the CString it returns.

void ClearEvent( ):

This function will clear out any data that is stored in any of the object's member variables, with the exception of m_ThisDN. m_ThisDN is kept because the destination number will remain the same while the agent is connected to the server. The return value is void.

short DeleteUserData(long lParam, LPCTSTR dn, LPCTSTR szInKey):

This function takes three parameters, however, it does not use the first two (lparam & dn). The function is designed to delete a portion of the m_UserData variable, which must be a "," deliminated string. The szInKey parameter is the key of the data the function will delete, and the function will delete the data in the string that resides between the two commas following the key.

short DeleteAllUserData(long lparam, LPCTSTR dn):

The function does not use the two parameters passed. The function will set the m_UserData member variable to an empty string (" ").

CContactClient Class:

The CContactClient class is an API designed to facilitate the communications between the Agent application and the CServer via TCP/IP sockets by establishing/terminating the server connection and sending/receiving data. Additionally, the CContactClient class functions as a wrapper for the CContactEvent class.

Variables:

Variable names followed by (.cpp) are declared within the .cpp file rather than the .h file. This is so the ReceiveThread function, a statically declared function, can use these variables.

| | | |
|---|---|---|
| m_ServerName | CString | Stores the IP address of the server connected to. |
| pEventSocket | CContactSocket | Pointer to a CContactSocket object. |
| ConnectionStatus | SocketStatus | Enum type defined in the CContactSocket class. Refers to the status of the socket connection to the server. |
| CurrentEvent | CContactEvent | Inbound CContactEvent object from the socket. |
| TMessageString [86] | CString array | String representation of the TMessageType enum from Ttypes.h. |
| ErrMsg [3] | CString array | Error string message associated with the #define constants listed in the previous section. |
| pListenerSocket (.cpp) | CContactSocket | Pointer to CContactSocket object the receive thread uses. |
| EVENT_OBJECT (.cpp) | struct | Structure for a single linked list containing a CContactEvent object and a pointer to the next link. |
| pEventHead (.cpp) | EVENT_OBJECT | Pointer to the head of the linked list. |
| OutboundEvent (cpp) | CContactEvent | CContactEvent object to be sent to CServer. |
| m_hWindow (.cpp) | HWND | |

-continued

| m__lWindow (.cpp) | long | |
|---|---|---|
| m__Msg (.cpp) | UINT | |
| m__hListender | HANDLE | Handle for receive thread. |

Functions:

Constructor: The constructor initializes the pointers pEventHead, pEventSocket, and pListenerSocket to null; initializes the string messages for the ErrMsg array; and initializes the string descriptions for the TMessageString array.

Destructor: Calls CContactEvent's member function ClearEvent( ) to clear data stored in CurrentEvent and OutboundEvent. Deletes all elements that may exist in the EVENT_OBJECT linked list, including pEventHead. Closes the receive thread and sets pListenerSocket to null. Disconnects from CServer and sets pEventSocket to null.

short Open(LPCTSTR szServerName)
short Open(LPCTSTR szServerName, ClientType client):

This overloaded function takes one or two parameters. szServerName refers to the IP address of the server to connect to and client refers to the type of client logging in (i.e., monitor client, agent client, or web client).

The function checks pEventSocket for a null value. If null, it allocates and CContactSocket object with the new keyword. Next, the function checks ConnectionStatus for a connected state. If connected, it sets an error message advising a server connection already exists and returns a false, or 0, value. If no connection exists, the function sets the client type for the CContactSocket with client, or a default of AGENT_CLIENT if the function does not receive a client parameter; sets CContactClient's m__ServerName with szServerName; and calls CContactSocket's connect function to make a connection to the server.

If the connection fails, the function sets an error message with the error received from the CContactSocket object, deletes pEventSocket, and the function will exit with a false value.

If a successful connection occurs, a second thread is started for receiving events from CServer.

short CloseServer( ):

Calls CContactEvent's member function ClearEvent( ) to clear data stored in CurrentEvent and OutboundEvent. Deletes all elements that may exist in the EVENT_OBJECT linked list, including pEventHead. Closes the receive thread and sets pListenerSocket to null. Disconnects from CServer and sets pEventSocket to null.

short isEventReady( )
short NextEvent( ):

These two functions have the same functionality.

These functions will remove the first element in the EVENT_OBJECT linked list and shift the second link to the head. When called, if pEventHead is null, the function(s) clear any data that CurrentEvent has stored in its member variables and sets the return value to false, or 0.

If the first element in the list is the only element, the function removes the element and sets pEventHead to null. Otherwise, the function removes the first element and the second link becomes the first.

CString GetSocketString( ):

This function calls CContactEvent's GetSocketString function to format CurrentEvent's member variables into a single, pipe ("|") deliminated string. The function returns the formatted string.

void CreateEvent(CContactEvent NewEvent):

This function will add a received event to the end of the EVENT_OBJECT linked list. If an empty list exists, it adds NewEvent as the first link. Otherwise, the function will add NewEvent to the end of the list.

BOOL StartThread(LPCTSTR ServerName, ClientType Client):

This function calls CreateThread (MFC) to start the receive thread.

sstatic DWORD WINAPI ReceiveThread(LPVOID socket):

This is the second thread designed to receive incoming events from CServer. The thread loop will block on the socket until an event is received. When received, the function will pass the event to CreateEvent(CContactSocket NewEvent) for addition to the linked list. If the received event is EventRegisterMachine, the function sets Outbound-Event's m__ThisDN variable with the m__ThisDN variable of the CContactEvent object received. Additionally, the function will post a message to the window if one is received.

Wrapper functions for CContactEvent:

void SetVariableName(type): The following functions act as a wrapper for the CContactEvent class. Each function is operating on the OutboundEvent object to set its member variables prior to sending the object to CServer. They accomplished by calling the object's member function(s) that correspond to setting the desired member variable. Each function takes a single parameter of the same type as the CContactEvent member variable to set and has a return value of void.

type GetVariableName( ): Again, the following functions act as a wrapper for the CContactEvent class. Each function is operating on the CurrentEvent object to get the data stored in its member variables. This is accomplished by calling the object's member functions that correspond to retrieving the desired member variable. Each function takes no parameters and returns a value of the same type as the CContactEvent member variable to retrieve.

short CallbackOn(LPCTSTR dn, short logtype): this function requests CServer set the agent's ability to handle callbacks on. It sets the OutboundEvent's m__Event to EventCallbackOn, and sets m__ThisDN and m__LoginType with the parameters passed.

The function will check pEventSocket for a null value. If null, the function sets an error message advising no server connection exists and will return a false, or 0, value. Next, the function will test OutboundEvent's m__ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentLogout(long lParam, LPCTSTR dn):

This function requests CServer log the agent out. It sets OutboundEvent's m__Event with RequestAgentLogout and m__ThisDN with dn.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short MakeCall(long lparam, LPCTSTR dn, LPCTSTR szPhoneNumber):

This function requests CServer place a call. It sets OutboundEvent's m_Event with RequestMakeCall, m_Ani with szPhoneNumber, and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short CallAnswer(long lparam, LPCTSTR dn):

This function requests CServer answer a call. It sets OutboundEvent's m_Event with RequestAnswerCall and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentReady(long lParam, LPCTSTR dn):

This function requests CServer set an agent's status to ready. The function sets OutboundEvent's m_Event to RequestAgentReady and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentNotReady(long lparam, LPCTSTR dn):

This function requests CServer set an agent's status to not ready. The function sets OutboundEvent's m_Event to RequestAgentNotReady and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. if not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentBusy (long lparam, LPCTSTR dn):

This function requests CServer set an agent's status to busy. The function sets OutboundEvent's m_Event to RequestAgentBusy and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short AgentNotBusy(long lParam, LPCTSTR dn):

This function requests CServer set an agent's status to not busy. The function sets OutboundEvent's m_Event to RequestAgentNotBusy and m_ThisDN with dn. The function does not use lParam.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short DeleteCallback(CString ANI, CString IP):

This function requests CServer delete a callback. It sets OutboundEvent's m_Event to RequestDeleteCallback, m_Ani with ANI, and m_IP with IP.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

short UpdateCallback(CString appl_data, CString origination, CString method, CString IP, CString ANI, CString NaspID, CString ContactTime, int ContactResult):

This function requests CServer update an existing callback. It sets OutboundEvent's m_Event to RequestUpdateCallback, m_IP with IP, and m_Ani with ANI. The remaining parameters are formatted into a "^" deliminated string and set to OutboundEvent's m_UserData variable.

The function will check pEventSocket for a null value. If null, the function sets an error message advising no server connection exists and will return a false, or 0, value. Next, the function will test OutboundEvent's m_ThisDN for an empty string. If empty, it sets an error message advising no DN registered and will return a false value. Lastly, the function will check the ConnectionStatus variable for a connected state. If not connected, it sets an error message advising no server connection exists and will return a false value. If these three tests pass, the function will send the OutboundEvent to the CServer over the socket and return a true, or 1, value. Prior to exiting, the function calls CContactEvent's ClearEvent function to clear data stored in the OutboundEvent's member variables.

I claim:

1. In a communications network, a system for establishing and maintaining communications between a customer and a business having a plurality of call centers over a plurality of communications media, said system comprising:
    (a) a first means for establishing a first communications link between a customer and a company web server;
    (b) a second means for tracking available resources at each of said plurality of call centers, said resources including a call center agent having a particular skill set and availability status, said second means further selecting a call center having a qualified agent available to communicate with said customer;
    (c) a third means for establishing a second communications link between said selected call center and said customer, the second communications link being established at a time specified by said customer; and
    (d) a premises contact server located at each of said plurality of call centers having means for managing and synchronizing simultaneous IP communications between said web server and said selected call center, and between said web server and said customer,
    wherein said agent at said selected call center and said customer may each view said first communications link while communicating with each other over said second communications link, and
    wherein each said premises contact server further includes means for communicating call center event messages including resource availability status to said second means.

2. In a communications network, a system as claimed in claim 1, wherein said first communications link is an IP communications link.

3. In a communications network, a system as claimed in claim 1, wherein said third means includes a telephony automatic call director and a telephony server.

4. In a communications network, a system as claimed in claim 3, wherein said premises contact server communicates with said automatic call director through said telephony server.

5. In a communications network, a system as claimed in claim 2, wherein said IP communications link includes a link which enables a customer to request a call back if an agent is not available.

6. In a communications network, a system as claimed in claim 1, wherein said third means enables communication with said customer with a communications protocol selected from the group of broadband telephony, TCP/IP, SMTP, chat, internet telephony or internet video.

7. In a communications network, a system as claimed in claim 1, wherein said system includes a data base server to authenticate a customers entitlements at said call center.

8. In a communications network, a system as claimed in claim 6, wherein said second means includes a data base server to match the qualifications of a call center agent to a customers call back request.

9. In a communications network, a system as claimed in claim 1, wherein said system further includes a data base server for providing access to data relating to services provided by the business to the customer.

10. In a communications network, a system as claimed in claim 2, wherein said system further includes first and second linked web servers separated by a security means, with said first web server communicating with said agent, and said second web server communicating with said customer, said second web server providing at least one Java applet to said customer over said IP communications link.

11. In a communications network, a system as claimed in claim 1, wherein said second means further selects a qualified agent for communication with said customer.

12. In a communications network, a system as claimed in claim 1, further including means for generating a status query message to a selected call center to ascertain availability of call center agents having desired skill set, said contact server of said selected call center generating a response to indicate presence of a qualified call agent.

13. In a communications network, a system as claimed in claim 12, further including means for selecting another one of said plurality of call centers if a qualified agent is not available at said selected call center.

14. In a communications network, a method for establishing and maintaining communications between a customer and one of a plurality of call centers over a plurality of communications media, said method comprising:
    establishing a html communications link between a customer and a company web server which enables the customer to request a call back;
    determining resource availability at each one of said plurality of call centers for said customer, and selecting a call center having a qualified agent available to communicate with said customer;
    authenticating said customer's entitlement at said selected call center;
    establishing a second communications link between said selected call center and said customer at a time specified by said customer; and
    managing and synchronizing simultaneous html communications between:
        (i) said web server and said selected call center, and
        (ii) said web server and said customer,
    wherein said agent may communicate with said customer over said second communications link while each views said simultaneous html communications links.

15. In a communications network, a method as claimed in claim 14, wherein said step of establishing said second communications link includes establishing a telephony link with said customer.

16. In a communications network, a method as claimed in claim 14, further including the step of enabling the customer to request a call back from an agent if an agent is not available.

17. In a communications network, a method as claimed in claim 14, wherein said step of establishing a second communication link enables communication with said customer with a communications protocol selected from the group of broadband telephony, TCP/IP, SMTP, chat, internet telephony or internet video.

18. In a communications network, a method as claimed in claim 14, wherein said step of selecting said call center having qualified agent available further includes the step of matching the qualifications of a call center agent to a customers call back request.

19. In a communications network, a method as claimed in claim 14, further including the step of providing customer and agent access to data relating to services provided by the company to the customer.

20. In a communications network, a method as claimed in claim 19, further including the step of providing access to data relating to trouble tickets on services provided by the company to the customer.

21. In a communications network, a method as claimed in claim 14, further including the step of synchronizing first and second web servers with fixed IP addresses to provide security for company data, with said first web server communicating with said agent, and said second web server communicating with said customer.

22. In a communications network, a method as claimed in claim 21, further including the step of communicating at least one Java applet from said second web server to said customer over said IP communications link.

23. In a communications network, a system for distributing inbound telephone call events received at a telecommunications network switch over a public switched telephone network to one of a plurality of call centers owned by a business enterprise, each said event having a first set of call data associated therewith, said system comprising:

(a) a means for routing said call to a voice response unit capable of obtaining information from the caller;

(b) a means for tracking available resources at each of said plurality of call centers, said resources including one or more call center agents each having a particular skill set and availability status, said tracking means further selecting one of a call center and call center agent based on said information from the caller, and communicating a second set of call data relating to said selected call center to said voice response means;

(c) an automatic call distributor means associated with each of said plurality of call centers for routing calls for transmission over said public switched telephone network, said voice response unit routing said call to a first said automatic call distributor means for forwarding said call over said public switched telephone network to a second automatic call distributor means associated with said selected call center, said voice response unit additionally routing said second set of call data to said selected call center;

(d) a premises contact server means located at said selected call center for receiving said first set of call data from said second automatic call distributor means and said second set of call data from said voice response unit and managing distribution of said call to an agent at said selected call center while sending said second set of data to a workstation associated with said agent, whereby said agent at said selected call center and said customer communicate with each other over said public switched telephone network, while said agent has updated data available to him at said workstation.

24. In a communications network, a system for distributing inbound telephone call events as claimed in claim 23, wherein said second set of call data is routed to said selected call center over one of a local area network and wide area network.

25. In a communications network, a system for distributing inbound telephone call events as claimed in claim 23, wherein said routing means includes a data access point for determining a destination for said call based on said first set of data.

26. In a communications network, a system for distributing inbound telephone call events as claimed in claim 23, wherein said first set of data includes data relating to an automatic number identifier.

27. In a communications network, a system for distributing inbound telephone call events as claimed in claim 25, wherein said second set of data includes data for routing the call to a particular destination.

28. In a communications network, a system for distributing inbound telephone call events as claimed in claim 25, wherein said second set of data includes data pertaining to a caller requesting a particular service.

29. In a communications network, a system for distributing inbound telephone call events as claimed in claim 23, wherein each said call center includes a telephony server means to facilitate routing of calls from said automatic call distributor to said premises contact server means.

30. In a communications network having a plurality of call centers for receiving service requests from customers, a method for continuing communication between a customer and one of said plurality of call centers on a call back basis, said call back communications enabled over a plurality of communications media, said method comprising:

establishing a html communications link between a customer and a company web server which enables the customer to request a call back;

determining resource availability at each of said plurality of call centers for said customer and selecting a call center having an available qualified agent;

identifying an agent at said call center available for call back communication with said customer;

triggering said customer call back request by running a Java applet embedded in an html communication received by the customer;

establishing a second communications link between said call center and said customer at a time specified by said customer;

managing and synchronizing simultaneous html communications between:
(i) said web server and said selected call center, and
(ii) said web server and said customer, wherein said agent may communicate with said customer over said second communications link while each views said simultaneous html communications links.

* * * * *